(12) United States Patent
McCaughan et al.

(10) Patent No.: US 6,173,282 B1
(45) Date of Patent: *Jan. 9, 2001

(54) ELECTRONIC SEALED ENVELOPE

(75) Inventors: Daniel Vincent McCaughan, Hollywood; Brian Michael Unitt, Bishops Stortford; Robert John Dean, Bishops Stortford; Yashvant Kanabar, Bishops Stortford, all of (GB)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/998,918

(22) Filed: Dec. 29, 1997

(30) Foreign Application Priority Data

Nov. 27, 1997 (GB) .................................... 9725064

(51) Int. Cl.[7] ........................................ G06F 17/30
(52) U.S. Cl. ................... 707/9; 707/10; 705/67; 712/28
(58) Field of Search ................. 707/9, 100, 103, 707/10, 3; 705/3, 67; 713/200, 201, 202; 709/220, 229; 712/28; 382/115

(56) References Cited

U.S. PATENT DOCUMENTS

| | | | |
|---|---|---|---|
| 4,995,081 | * 2/1991 | Leighton et al. | 235/379 |
| 5,146,499 | * 9/1992 | Geffrotin | 235/379 |
| 5,276,901 | * 1/1994 | Howell et al. | 707/9 |
| 5,321,750 | * 6/1994 | Nadan | 380/230 |
| 5,408,608 | * 4/1995 | Ryu et al. | 707/1 |
| 5,446,903 | * 8/1995 | Abraham et al. | 707/9 |
| 5,450,491 | * 9/1995 | McNair | 235/380 |
| 5,594,910 | * 1/1997 | Filepp et al. | 712/28 |
| 5,613,012 | * 3/1997 | Hoffman et al. | 382/115 |
| 5,678,041 | * 10/1997 | Baker et al. | 707/9 |
| 5,680,613 | * 10/1997 | Atsumi | 707/103 |
| 5,684,985 | * 11/1997 | Ahmadi | 707/100 |
| 5,721,781 | * 2/1998 | Deo et al. | 705/67 |
| 5,734,823 | * 3/1998 | Saigh et al. | 709/229 |
| 5,758,072 | * 5/1998 | Filepp et al. | 709/220 |
| 5,802,518 | * 9/1998 | Karaev et al. | 707/9 |
| 5,815,719 | * 9/1998 | Goebel | 717/7 |
| 5,864,871 | * 1/1999 | Kitain et al. | 707/104 |

OTHER PUBLICATIONS

Chang, C. et al., "Remote password authentication with smart cards", IEEE Proceedings of the Computers and Digital Techniques, May 1991, vol. 138, Issue 3, pp. 165–168, May 1991.*

Cordonnier, V.M., "Smart cards: present and future applications and techniques", Electronics and Communication Engineering Journal, Oct. 1991, vol. 3, Issue 5, pp. 207–212 Oct. 1991.*

* cited by examiner

Primary Examiner—Hosain T. Alam
Assistant Examiner—Shahid Alam
(74) Attorney, Agent, or Firm—Lee, Mann, Smith, McWilliams, Sweeney & Ohlson

(57) ABSTRACT

Restricted data is stored on a smart card having a memory and a processor. Preferably the restricted data is stored in groups. The smart card may store a record of users authorized to access certain groups of restricted data. An owner of the smart card must authorize registration of new users by entering their password, the new users are then given their own passwords in order to retrieve certain groups of restricted data. When a registered user uses their password to retrieve restricted data the smart card irretrievably modifies a codeword in a codeword section of the restricted data group, each codeword corresponding to an authorized user. The owner of the smart card is then able to determine if the restricted data has been accessed by checking for modified codewords.

24 Claims, 9 Drawing Sheets

| PASSWORD | TIME & DATE | REGISTERED USER | DATA GROUP | DATA GROUP CODEWORD TO MODIFY ON ACCESS |
|---|---|---|---|---|
| PW 1 | 12:15 5/8/97 | Hilton Hotel | Medical | Codeword 2 |
| PW 2 | 23:58 18/6/97 | General Hospital | Medical | Codeword 3 |
| ⋮ | | | | |

Fig. 6

| CARD ID | MEDICAL | FINANCIAL | ... |
|---|---|---|---|
| 1 | PW 1 | — | |
| 2 | PW 3 | PW 4 | |
| | | | |

701 = CARD ID, 702 = MEDICAL, 703 = FINANCIAL

Fig. 7

ELECTRONIC SEALED ENVELOPE

FIELD OF THE INVENTION

The present invention relates to a method and apparatus for accessing and retrieving restricted data.

BACKGROUND TO THE INVENTION

In certain circumstances, a person may wish other parties to have access to personal information which he/she would normally wish to remain private. For example, a guest at a hotel may wish the hotel to have access to details such as name and address of next of kin, serious medical conditions, etc in the event of an accident occurring during their stay at the hotel. However, the person may not be comfortable with having hotel staff reading their personal information other than in an emergency situation. To overcome this problem, it is known to write personal information on a piece of paper which is then sealed inside an envelope. The guest then presents the sealed envelope and contents to the hotel reception upon arrival, instructing them that it contains information which may be necessary in an emergency. In the event of an emergency the hotel staff would then be able to open the envelope to find out the information contained in it. If no emergency situation arose during the guest's stay, the guest would retrieve the sealed envelope at the end of their stay, reassured in the knowledge that the contents of the envelope have not been disclosed if the envelope's seal is intact.

The owner of the envelope must rely upon their own assessment of whether the envelope has been opened or not. If another party was determined to discover the contents of the envelope, they might try to deceive the owner by resealing the envelope after opening it, or replacing an opened envelope with an identical new one.

The known paper sealed envelope is only available to the party which the owner has given it to. In some instances, it might not be possible to retrieve the envelope from the party to whom it was given, for example if an accident occurred, medical staff arriving at the scene may be unaware of the existence of the sealed envelope at the hotel. A possible solution to this problem would be for the person to carry the sealed envelope at all times. However, this would mean that sensitive information would be vulnerable if the envelope was lost or stolen. It would also be desirable for the information to be available for more than one party, for example a chain of hotels which the guest regularly stays in, or a hotel would also be able to give a copy of the sealed envelope to local hospitals in case of an emergency. However, the envelope owner would need to keep track of all the envelopes to ensure that none of the contents had been read.

People often carry information in electronic form, for example in devices such as personal organizers or a mobile phone's memory. Information stored in electronic form has advantages for the user, such as being able to search for certain information quickly. However, unless the information is protected by some means the information may be read by anybody who has access to the electronic device with or without the owner's consent. Additionally, the owner of the device may not be aware of unauthorized access since most electronic personal organizer devices do not keep a record of data accesses. In an attempt to prevent unauthorized access many electronic databases are protected by a password. The problem with using passwords is that they must be provided to everybody who might need to access the information stored in electronic form in an emergency.

SUMMARY OF THE INVENTION

One object of the present invention is to provide an electronic medium as an alternative to a conventional sealed envelope, for storing personal or restricted data.

Another object is to provide access to personal or restricted data with accountability of recording details of persons or systems to whom the data has been released.

According to a first aspect of the present invention there is provided apparatus for retrieving restricted data, comprising: a data storage system containing restricted data; and one or more data accessing systems for accessing data from said data storage system, wherein said data storage system irretrievably modifies said stored data as a result of said data being accessed by a said accessing system.

In a simple embodiment, the data storage system comprises a computer and the restricted data is stored as one or more files on a data storage system, such as a hard disk. A file may be defined as a logical collection of storage areas on a storage medium which an accessing device recognizes as a single entity. A secret codeword known only to an owner of the restricted data may be appended to each file. Before disclosing the restricted data to the accessing system, the storage system deletes or changes the secret codeword. This modifying of the codeword allows the owner to determine that the information has been accessed. The accessing system is preferably unaware of the modifying and is not aware of the original state of the codeword before it is modified so that the original secret codeword cannot be retrieved or replaced without knowledge of its original or previous state.

In a second simple embodiment, the restricted data may be stored in a One Time Programmable Read Only Memory (OTPROM). OTPROM devices are supplied by a manufacturer with all data storage units on the device capable of storing one bit, set to an initial state (binary 0 or binary 1). The storage devices are programmed by setting selected bits to the opposite state. Once changed from the initial state, properties of OTPROM devices mean that the state of the storage devices cannot be changed a second time. Preferably, one or more user-specified storage units on the OTPROM are left in their unset state and, once restricted data is accessed by an accessing system, the storage system programs the unset storage units to the opposite state. This setting of unset memory units allows the owner of the restricted information to determine that the information has been accessed. Since OTPROM device's memory units cannot be changed after being set a first time, the accessing system is not able to retrieve the original unset state of these memory units, and is not able to restore the original state.

Preferably an accessing system provides a password to said data storage system in order to retrieve said restricted data.

Preferably, the restricted data can be irretrievably modified in more than one way, wherein the way in which the restricted data is irretrievably modified is determined by the password supplied to the data storage system by the data accessing system.

Preferably restricted data is stored in groups which can be individually selected for access by the accessing system and wherein each group can be individually irretrievably modified.

Preferably, where restricted data is stored in groups, the password supplied by the accessing system further limits access to one or more groups of restricted data.

Preferably, the irretrievable modification of the restricted data enables the owner of the data to determine the time and date of the access. As an example, if the restricted data is stored on a computer disk and contains one or more secret codewords known only to the data owner, the secret codeword is replaced with a second codeword containing encrypted time and data information. Not only can the owner then determine that the information has been accessed by the fact that his secret codeword has been changed, but also the owner can decrypt the new codeword to determine the data and time of access.

Preferably, said data storage system comprises one or more smart cards, each having a memory. Preferably each smart card also comprises a processor. Preferably, said data storage system contains a registration record comprising a list of said accessing system authorized to access said restricted data. Preferably, said restricted data is stored in groups, and a said accessing system provides a group specific password to said data storage system in order to retrieve data from a specific said group. Preferably, said accessing systems comprise a card access device and a processor connected to a communications network, preferably including a PBX through which communication to a remote data storage system can take place.

According to a second aspect of the present invention there is provided a method of retrieving restricted data from a data storage system by one or more users, comprising the steps of: accessing said restricted data; and irretrievably modifying said restricted data to indicate said access.

Preferably, said method comprises the step of providing a password to said data storage system.

Preferably, said restricted data is stored in groups.

The modification to the restricted data may enable an owner of the data to determine which data groups have been accessed by individual ones of said users.

Preferably, said restricted data is stored in groups, and said method comprises the step of providing a group specific password to said data storage system in order to retrieve data from a specific said group.

Preferably, said stored data contains at least one codeword, each said codeword corresponding to a respective said user.

Preferably, the method includes the step of creating and maintaining a registration record comprising a list of said users authorized to access said restricted data.

Preferably, said stored data contains at least one codeword, each said codeword corresponding to a respective said user and a said codeword is irretrievably modified to indicate accessing of restricted data by said user.

Preferably, said method includes the step of limiting access to said restricted data after said irretrievable modification.

Preferably, said irretrievable modification comprises storing data describing accessing of said restricted data by a said user.

Preferably, said irretrievable modification comprises storing data describing a time of said accessing of said restricted data by a said user.

Preferably, said restricted data is stored in one or more data files.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 6 illustrates the format of the registration record created in FIG. 5;

FIG. 7 illustrates the format of another registration record;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 1:
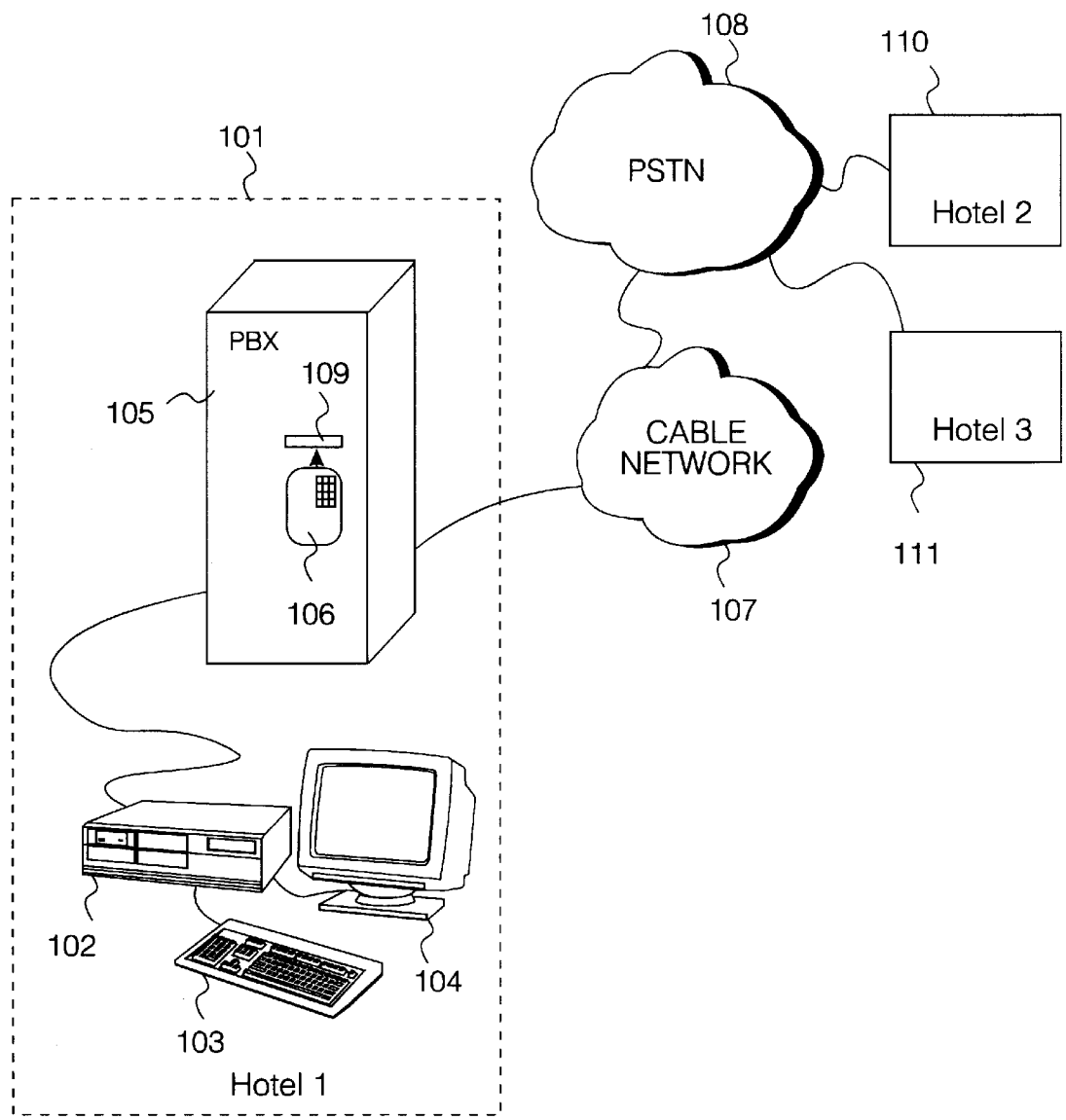
FIG. 1 illustrates a data access and retrieval system including a smart card for storing information.

FIG. 1 of the accompanying drawings illustrates a data access and retrieval system including an information server in a hotel 101. The information server comprises a personal computer (PC) 102 having a keyboard 103 and a display monitor 104. The PC 102 can communicate with other devices via a communications network 108. In order to interact with the communications network 108 the PC 102 is attached to a private branch exchange (PBX) 105 which has a direct link, eg via a cable network 107 to the communications network 108.

The PBX interface 105 includes a smart Card Acceptance Device (CAD) 109. The CAD 109 is configured to receive a smart card 106 and read/write data from/to the smart card. The smart card 106 comprises a plastic card of similar dimensions to a standard credit card and includes an integrated circuit. Smart card technology is known in the prior art [Smart Card Technology: Introduction to Smart Cards—David B Everett http://www.smartcard.co.uk/tech1.html], is a common term for portable data storage devices of small dimension typically in the range width 20 mm to 90 mm, length in the range 20 mm to 60 mm and thickness 0.2 mm to 2 mm which the International Standards Organization (ISO) refer to as integrated circuit cards (ICC) in ISO standards IS 7810 to IS 7816 and related standards, the contents of which are incorporated herein by reference. Such cards comprise an integrated circuit having a central processing unit (CPU) and a memory module, typically a read only memory (ROM), a programmable read only memory (PROM), an erasable programmable read only memory (EPROM), an electrically erasable programmable read only memory (EEPROM) or a random access memory (RAM). The smart card's CPU is programmed to allow data to be written or read from the smart card's memory if a valid password is presented via a CAD. The smart card comprises in-built security logic in the form of control signals stored in the memory, for operating the CPU to control access to the memory device only under restricted conditions. Typically, an access code, which may be quite large (eg 64 bits or more) is used to control access to the memory. The CPU is capable of implementing cryptographic algorithms. The CAD 109 receives messages from PC 102, including a password. If the smart card in the CAD 109 accepts a password it allows the CAD 109 to read or write data to the smart card's memory under the control of PC 102. Data written to the smart card's memory by PC 102 may be entered via keyboard 103. Data retrieved from the smart card may be transferred to PC 102 and displayed on monitor 104.

Also connected to communications network 108 are other hotels 110 and 111. Data retrieved by CAD 109 of PBX interface 105 may be transmitted across the telecommunications network to the other hotels. Each of the hotels 110, 111 has a similar data server comprising a PBX interface connected to a PC. If the PBX at hotel 101 has registered a password and the card owner wishes that the other hotels be able to retrieve information from smart card 106 then data may be retrieved at hotel 110 or hotel 111.

Figure 2:
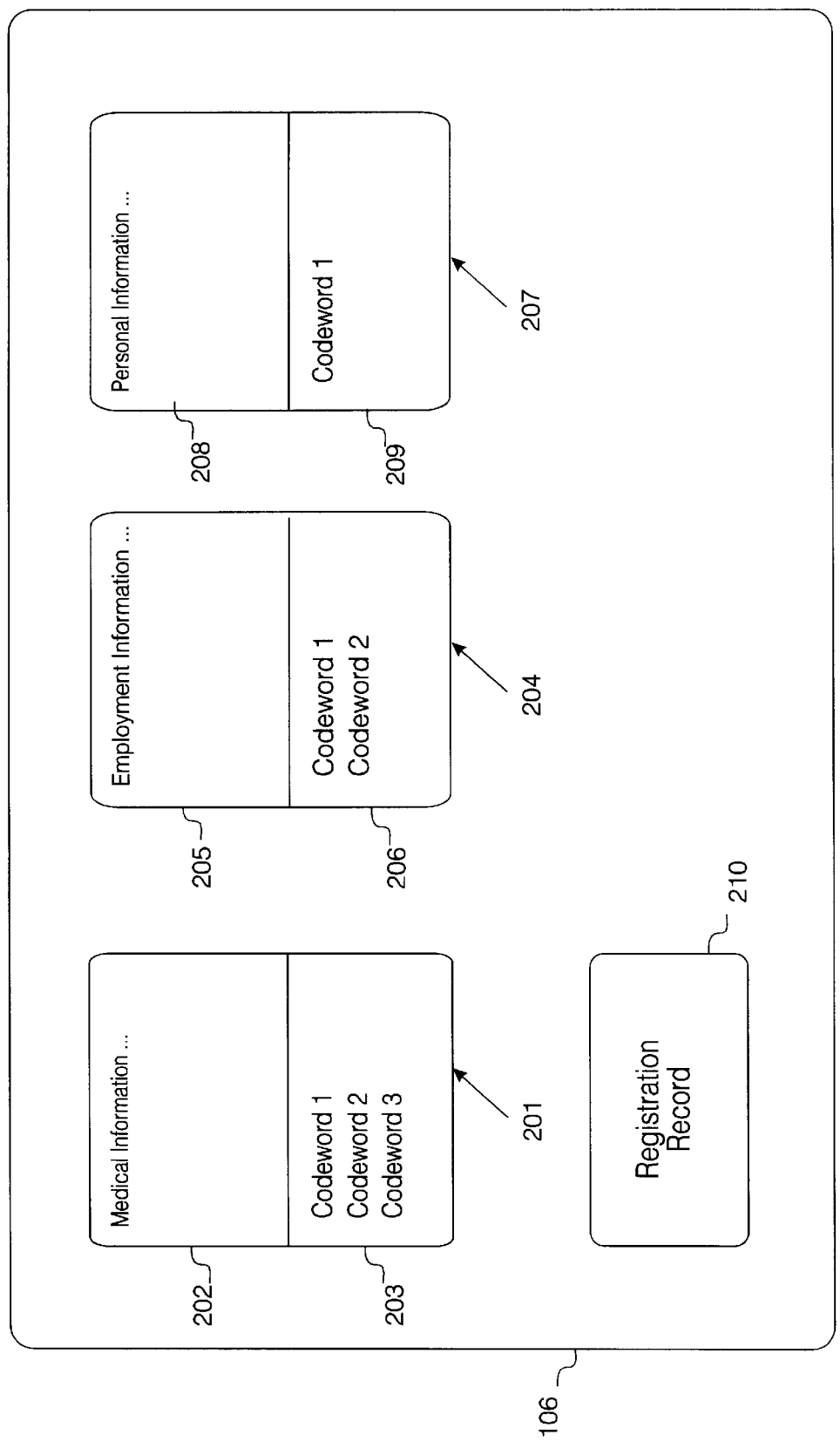
FIG. 2 illustrates a general principal of operation of the data access and retrieval system of FIG. 1, wherein the data store of the smart card comprises restricted data groups, and a registration record.

Referring to FIG. 2 herein, the memory and CPU of the smart card 106 is shown storing different groups of data. Data group 201 comprises medical information. The medical information data group 201 contains two sections. Information section 202 of medical group data 201 comprises actual medical information which may be accessed and retrieved by authorized users. Codeword section 203 of medical data group 201 may be appended onto the end of the medical data group. Codeword section 203 comprises, in the example shown in FIG. 2, three separate codewords. The three separate codewords mean that three users have been authorized to access and retrieve medical information stored in section 202.

Other data groups shown in FIG. 2 include employment data group 204, which comprises employment information section 205 and employment data group codeword section 206. Smart card 106 also includes personal information data group 207 which comprises personal information section 208 and personal information codeword section 209. Codeword section 209 contains only one codeword indicating that only the card owner may access personal information section 208.

In a preferred embodiment a codeword section of a data group is modified when the information section of the data group is accessed by a registered user. For example, if medical information section 202 of data group 201 was accessed by an authorized user the codeword in codeword section 203 corresponding to that user would be irretrievably modified. For example, if the medical information was accessed by a hotel server and that hotel server's codeword was codeword 2 then codeword 2 of codeword section 203 would be modified. The card owner would then be able to view which data groups have been accessed and retrieved by which authorized users. Although in the preferred embodiment the codeword section of a data group is appended to the end of the data group, it will be appreciated that the codewords could be stored anywhere within the data group, for example distributed throughout the information section using a pseudo-random algorithm in order to prevent the codewords being modified in an attempt to hide any retrieval of the data group.

Smart card 106 may also contain a registration record 210. The registration record contains a list of all authorized users and information describing which data groups they are allowed to access and retrieve. Information stored for each authorized user may include a time and date of registration of that authorized user, a name of the authorized user, a data group which the authorized user is allowed to access and retrieve, a password which the authorized user must use to be able to access and retrieve the data group and a reference to a codeword corresponding to the authorized user which may be stored in the codeword section of the data group. The reference to the codeword may be a pointer to its position in the codeword section.

Figure 3:
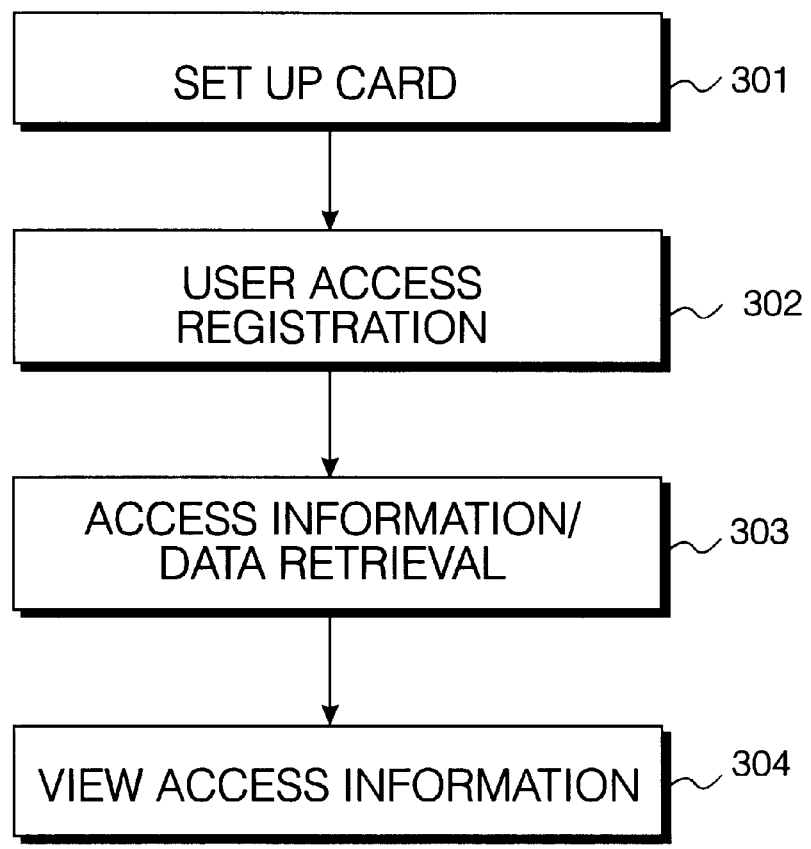
FIG. 3 illustrates typical usage of the smart card for data retrieval/storage including a set-up step, an access registration step, a data retrieval step and a view access information step.

FIG. 3 herein illustrates an example of steps which may occur during usage of a smart card for access and retrieval of restricted data. At step 301 the owner of the smart card sets up the card, a procedure typically included in this step is storing information in data groups. Users which may require access to the data stored on the card are registered at step 302. At step 303 data stored on the smart card is accessed and retrieved by a registered user. At step 304 the owner of the smart card, or another authorized party, views which registered users have accessed and retrieved data groups on the card.

Figure 4:
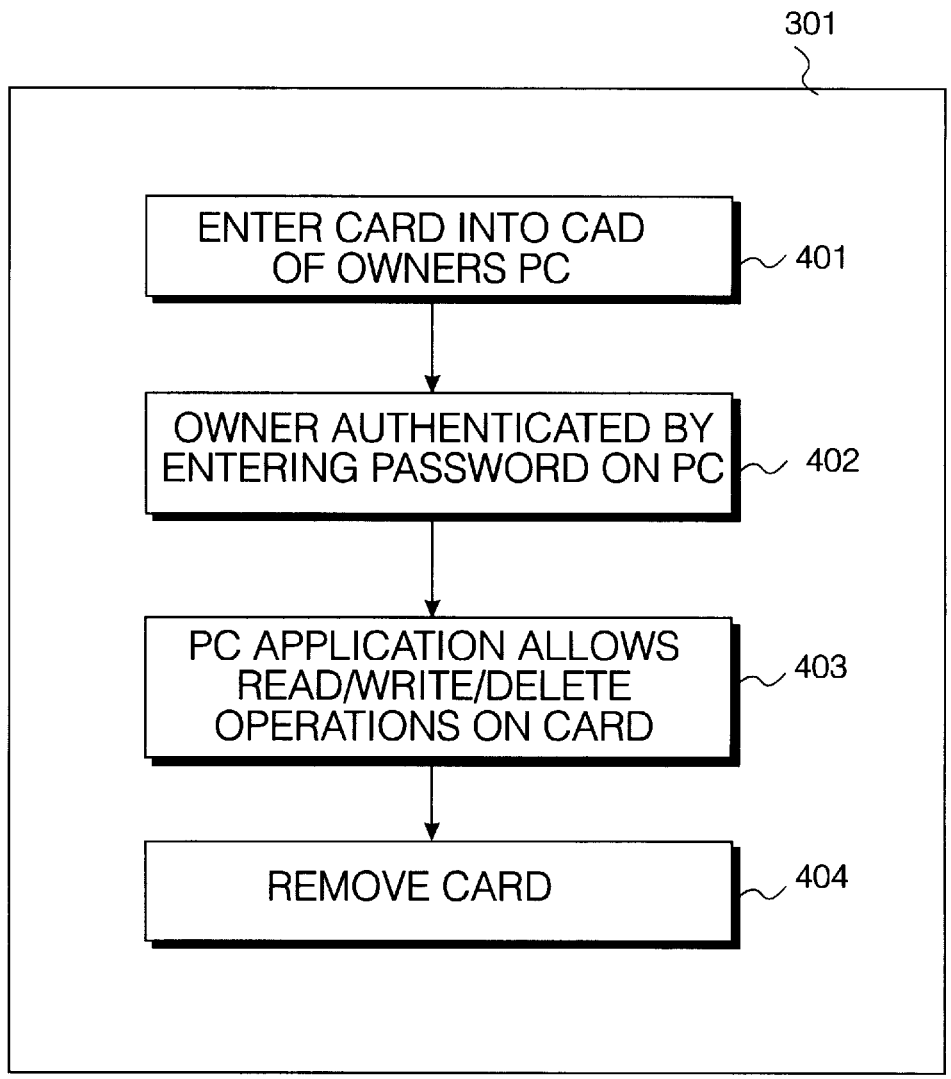
FIG. 4 illustrates the set-up step identified in FIG. 3.

The card set-up step 301 of FIG. 3 is detailed in FIG. 4 herein. At step 401 the smart card owner inserts the card into a CAD. The CAD is connected to a personal computer running application software for accessing the smart card. At step 402 the card prompts the software application to ask the owner to enter a password. If the correct password is entered at step 402 then control is passed to step 403. At step 403 the software application allows the contents of the smart card's memory to be edited. At this step 403 the card owner may update or delete data in certain data groups. It may also be possible for the card owner to define new data groups and authorize new registered users to access data or enter a date after which certain registered users will no longer be authorized to access particular data groups. When the card owner has completed editing the contents of the card's memory they exit the software application and remove the card from the CAD at step 404. The updated contents of the smart card's memory may now be accessed and retrieved by registered users at other information servers having an appropriate CAD and smart card accessing means.

Figure 5:
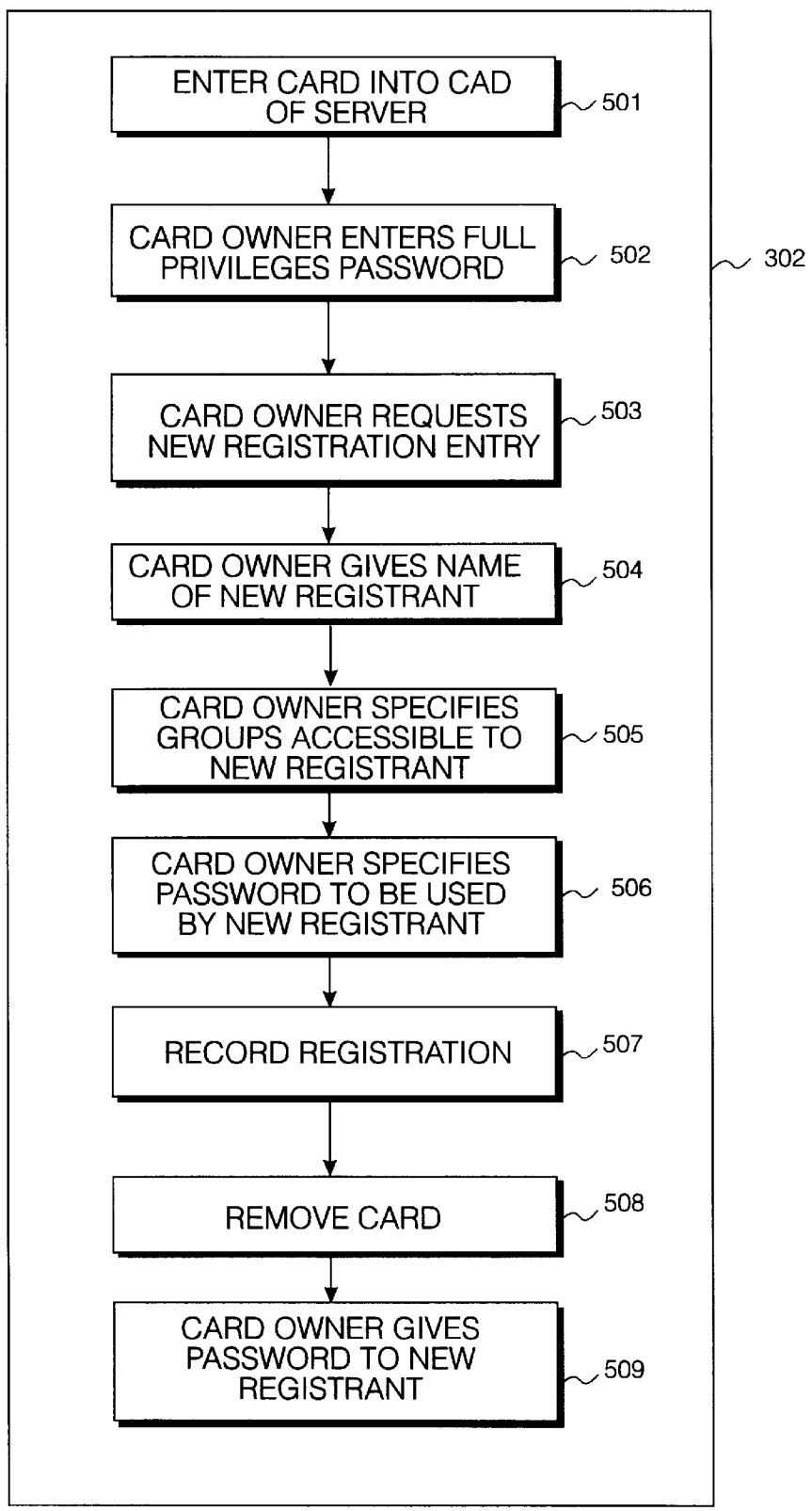
FIG. 5 illustrates the access registration step identified in FIG. 3, including the creation of the registration record.

FIG. 5 of the accompanying drawings details the user access registration step 302 of FIG. 3. At step 501 the smart card is inserted into the CAD of a server, for example hotel PC 102 and PBX interface 105. At step 502 the server requests the card owner's password. The card owner's password will usually be entered by the card owner himself/herself. At step 503 the server may display a menu of possible actions, the card owner selects the new user access registration procedure from the menu. At step 504 the card owner enters the name of a new user who will be authorized to access a particular data group. At step 505, the card owner specifies which data groups on the card are to be made accessible to the new user. At step 506 the card owner enters a password to be used by the new registrant. At step 507 information describing details of the registration may be written to the smart card's memory. Details of the registration will preferably be written to registration record 210 of the smart card. Details which may be written to registration record 210 include the name of the new registrant entered at step 504, the data groups which are accessible to the new registrant (specified at step 505), the password to be used by the new registrant in order to access the data group (specified at step 506) and a reference to a codeword, which may be generated by an algorithm running on the smart card CPU. The codeword will also preferably be written to the codeword section of the specified data groups. In order to cater for a large number of smart cards, each card owner supplying their own card and password to a hotel, the hotel may choose to store all such card owner information on its server, this data storing may be performed at step 507. Each smart card with which the hotel has been registered as an authorized user may be given a card identifier number which will be stored on the server's data storage along with the appropriate password to access and retrieve information from the specified data groups. In this way the hotel's password for accessing the smart card may not have to be disclosed to employees since inserting the smart card into a server running appropriate application software will automatically find the correct password from the server's data storage and give it to the smart card. It may also be possible to enter a date after which the details of the smart card and password are erased from the hotel server's data storage.

At step 508 the card is removed from the server's CAD. At step 509 the card owner may give the card to the new registrant (for example, to a hotel receptionist) or alternatively keep the card him/herself and tell the new registrant that they have permission to use the card to retrieve the information in an emergency. The card owner may tell one or more hotel employees the new registrant's password in order that they may be able to access the specified information if necessary.

The format of the data stored in the smart card's record of registration 210, updated at step 507 of FIG. 5, is illustrated in FIG. 6 herein. The registration record comprises a table of data entries. Each entry line in the table corresponds to a registration of a user to access a particular data group on the smart card. In the embodiment shown in FIG. 6, each registration line contains a password 601 specified for the registered user (at step 506 of FIG. 5), a time and date 602 of registration, and a name 603 of the registered user (specified at step 504 of FIG. 5). Each registration line may also identify the data group which the registered user is authorized to access 604. Each registration line may also identify a codeword 605 which is a reference to the same codeword contained in the codeword section of the data group which will be modified when the data group is accessed by the registered user. It will be appreciated that the registration record 210 could comprise further details of registration, such as a specific user's name to access the information, or a date at which the registration becomes invalid after which access to the restricted data group by the registered user is disabled.

In order to cater for a large number of guests, each supplying their own card, and password, a hotel may choose to store all such guest information on its server. The format of the hotel server's registration database, updated at step 508 of FIG. 5, is detailed in FIG. 7 herein. The registration database is implemented as a data table with each entry line in the table corresponding to a registration to access and retrieve information on a particular smart card. Each entry line may comprise a unique identifier 701 for each smart card registered. Each entry line also may comprise one or more passwords for accessing data groups to which the hotel server has been authorized to access. For example, passwords may be available for medical information 702 or financial details 703. Further data groups may also be included if the hotel server has access to such information and other data may also be stored in the registration database.

Figure 8:
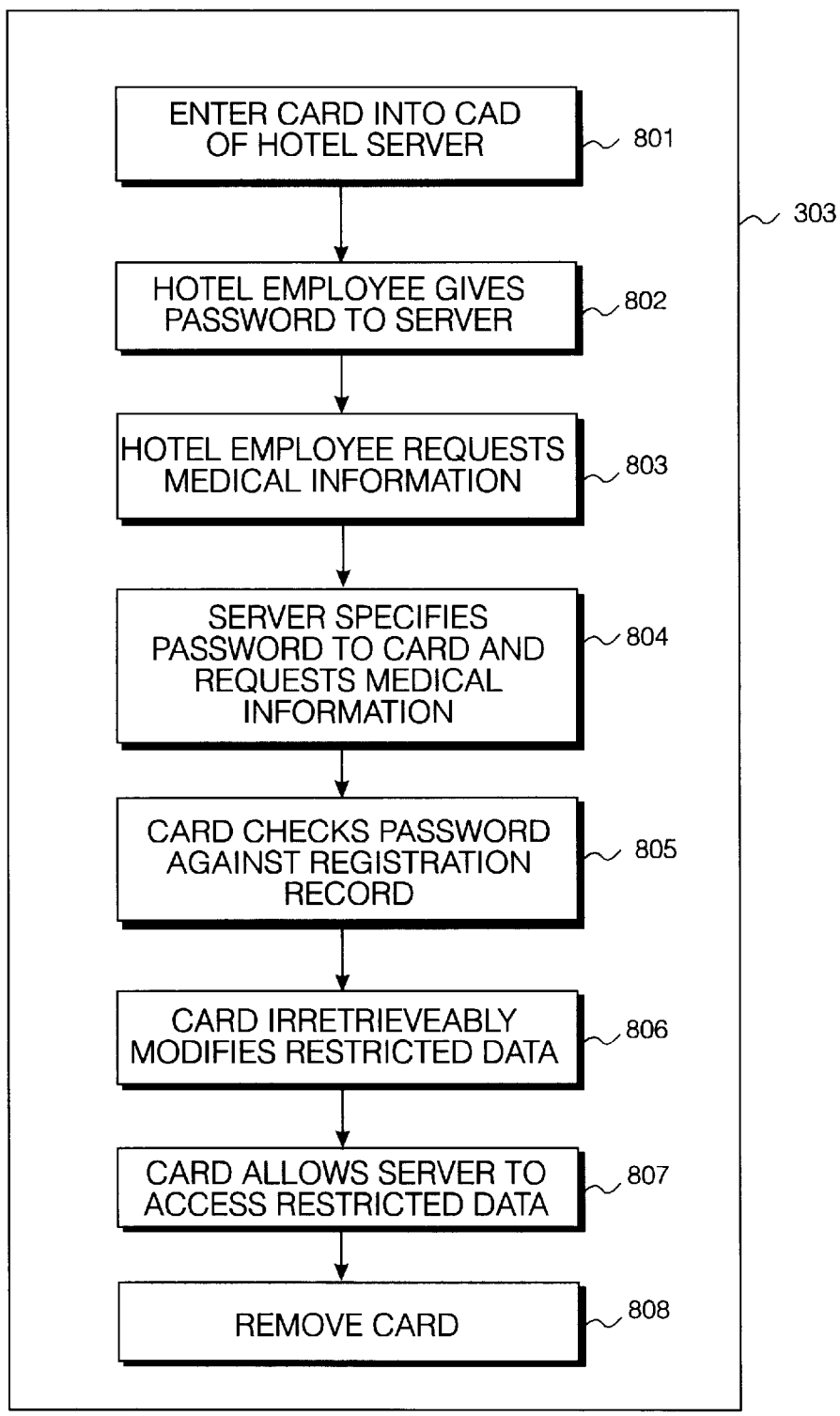
FIG. 8 illustrates the information retrieval step identified in FIG. 3.

FIG. 8 herein details an example of the data retrieval process, identified as step 303 of FIG. 3. At step 801 the smart card is inserted into the CAD of the hotel server's PBX. At step 802 the hotel employee enters the registered user's (in this case, the hotel's) password into the server. At step 803 the server displays a menu of data groups on the card to which the registered user has access. In this example, the hotel wishes to access medical information on the card, which the hotel authorized to access. At step 804 the server gives the registrant's password to the card with a request for the specified medical information The registrant's password may be typed in by a hotel employee to whom the password was told by the card owner, or the password may be transferred from the hotels server's registration database. At step 805 the card may check its registration table in order to ensure that the hotel has provided the correct password and that it is also authorized to access medical data group in order to retrieve the codeword which will be modified in the medical data group once it is accessed by the hotel server. Alternatively, the card may execute an algorithm which produces a codeword (possibly based on the password). At step 806 the card irretrievably modifies the medical data group in order to register accessing of the medical information. This is preferably achieved by modifying the hotel's codeword stored in the codeword section of the medical data group. The modified codeword may be changed to data describing a time and date of the access. At step 807 the server is allowed to access and retrieve medical information from the medical data group 201 on the smart card if the check at step 805 indicated that the correct hotel password and valid data group had been entered. After the hotel employee has viewed the medical information, the card is removed from the hotel server's CAD at step 808.

Figure 9:
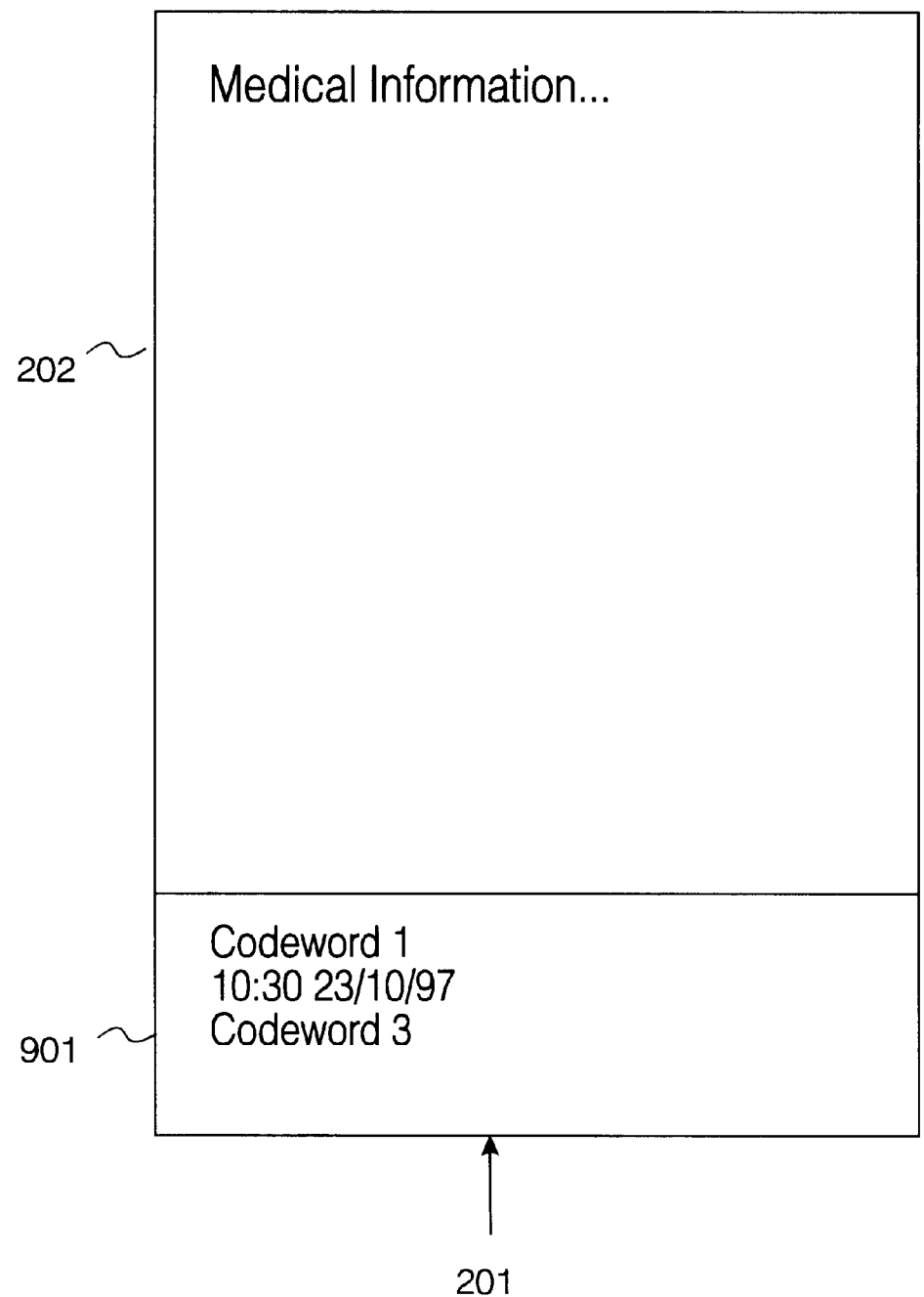
FIG. 9 illustrates restricted data after access.

FIG. 9 of the accompanying drawings illustrates contents of medical data group 201 after the hotel has accessed the medical information contained therein. Medical information section 202 of medical data group 201 remains unchanged. The data group section 203 of the medical information data group 201 is now shown as data group section 901. The second codeword, corresponding to the hotel's codeword has been modified to a time and date of access by the hotel. Optionally, and to improve security from tampering, this time and date information could be encrypted by the smart card before being stored using a known public or private key encryption system. Clearly, whenever restricted data is disclosed to an authorized user, the codewords are kept secret, though optionally the time and date information may be disclosed.

It will be appreciated that the modified codeword could contain further information, for example the identity of the operator who accessed the information, access attempts which used invalid passwords, etc.

When the card owner wishes to check if restricted data groups have been accessed (step 304 of FIG. 3) he/she may again use a PC with a suitable CAD to display the restricted information, noting which codewords have been changed from their initial values. Where date and time information has been stored in plain text form, the date and time of access can be read directly. Where date and time information have been encrypted, appropriate application software will allow the card owner to display the date and time in plan text once the required decryption key is supplied. Alternatively, the application software might check the codeword section of each data group, comparing it with codewords referenced by the registration record 210. If a codeword for a data group referenced by the registration record 210 is no longer present in the data group section of the respective data group then the name of the registered user corresponding to that codeword may be displayed together with the time and date information stored where the unmodified codeword should be stored in order to show that retrieval of a restricted data group using the registered users password has occurred.

The description hereinabove relates to restricted data stored in the memory of a smart card and access restriction mechanisms implemented in smart card CPU where the smart card is presented to a hotel server for potential access to the restricted data. It will be appreciated that similar methods and algorithms can be employed when the restricted data is stored on a remote computer system and the access restriction mechanisms are implemented on the CPU of the remote computer system, where the connection between the hotel server and the remote computer system is achieved using the communications network 108 of FIG. 1.

What is claimed is:

1. Apparatus for retrieving restricted data, comprising;
   a data storage system containing said restricted data and a pre-determined code word,
   wherein said code word is stored on a memory element which is modifiable only once;
   an access system arranged to download said restricted data and modify said code word;
   wherein said code word is not further modifiable, and wherein said modified code word indicates said restricted data has been accessed.

2. Apparatus according to claim 1, wherein a said accessing system provides a password to said data storage system in order to retrieve said restricted data.

3. Apparatus according to claim 1, wherein said data storage system stores said restricted data in groups.

4. Apparatus according to claim 1, wherein said data storage system stores said restricted data in groups, and a said accessing system provides a group specific password to said data storage system in order to retrieve data from a specific said group.

5. Apparatus according to claim 1, wherein there is a plurality of codewords, each of said codewords corresponding to a respective one of said one or more data accessing system.

6. Apparatus according to claim 1, wherein said data storage system contains a registration record comprising a list of said accessing systems authorized to access said restricted data.

7. Apparatus according to claim 1, wherein said stored data contains at least one codeword, each said codeword corresponding to a respective said accessing system and a said codeword is irrevocably modified to indicate accessing of said restricted data by said accessing system.

8. Apparatus according to claim 1, wherein access to said restricted data is limited after said irrevocable modification.

9. Apparatus according to claim 1, wherein said data storage system comprises one or more smart cards, each having a memory.

10. Apparatus according to claim 1, wherein said accessing systems comprise a card access device and a processor connected to a communications network through which communication to a remote data storage system can take place.

11. Apparatus according to claim 1, wherein said accessing systems comprise a card access device and a processor connected to a PBX through which communication to a remote data storage system can take place.

12. Apparatus according to claim 1, wherein said data storage system comprises a One Time Programmable Read Only Memory.

13. Apparatus according to claim 1, wherein said restricted data is stored in one or more data files.

14. A method of retrieving restricted data from a data storage system containing said data and a pre-determined code word, said code word being stored on a memory element which is modifiable only once, the method comprising:
   accessing said restricted data and modifying said code word such that said code word is not further modifiable, wherein said modified code word indicates said restricted data has been accessed.

15. A method according to claim 14, comprising the step of providing a password to said data storage system.

16. A method according to claim 14, wherein said restricted data is stored in groups.

17. A method according to claim 14, wherein said restricted data is stored in groups, comprising the step of providing a group specific password to said data storage system in order to retrieve data from a specific said group.

18. A method according to claim 14, wherein said stored data contains more than one codeword, each said codeword corresponding to a respective said user.

19. A method according to claim 14, comprising the step of creating and maintaining a registration record comprising a list of said users authorized to access said restricted data.

20. A method according to claim 14, wherein said stored data contains at least one codeword, each said codeword corresponding to a respective said user and a said codeword is irrevocably modified to indicate accessing of restricted data by said user.

21. A method according to claim 14, comprising the step of limiting access to said restricted data after said irrevocable modification.

22. A method according to claim 14, wherein said irretrievable modification comprises storing data describing accessing of said restricted data by a said user.

23. A method according to claim 14, wherein said irrevocable modification comprises storing data describing a time of said accessing of said restricted data by a said user.

24. A method according to claim 14, wherein said restricted data is stored in one or more data files.

* * * * *